United States Patent
Li et al.

(10) Patent No.: US 9,008,403 B1
(45) Date of Patent: Apr. 14, 2015

(54) METHOD OF COMPENSATING ULTRASOUND IMAGE

(71) Applicant: National Taiwan University, Taipei (TW)

(72) Inventors: Pai-Chi Li, Taipei (TW); Yu-Ming Wei, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 14/164,588

(22) Filed: Jan. 27, 2014

(30) Foreign Application Priority Data

Sep. 27, 2013  (TW) .............................. 102135058 A (51) Int. Cl.
  *G06K 9/00* (2006.01)
  *G06T 5/00* (2006.01)
  *G06T 7/00* (2006.01)

(52) U.S. Cl.
  CPC .............. *G06T 5/008* (2013.01); *G06T 7/0081* (2013.01); *G06T 2207/10132* (2013.01); *G06T 2207/20172* (2013.01)

(58) Field of Classification Search
  CPC .................. G06T 7/0012; G06T 2207/10116; G06T 11/003; G06T 7/0081; G06T 5/40; G06T 2207/10132; G06T 2207/20172; A61B 8/00; A61B 6/032; A61B 6/0306
  See application file for complete search history.

(56) References Cited

U.S. PATENT DOCUMENTS

| 5,579,768 | A | * | 12/1996 | Klesenski | 600/442 |
|-----------|---|---|---------|-----------|---------|
| 6,159,153 | A | * | 12/2000 | Dubberstein et al. | 600/443 |
| 6,413,218 | B1 | * | 7/2002 | Allison et al. | 600/443 |
| 6,572,547 | B2 | * | 6/2003 | Miller et al. | 600/437 |
| 6,592,520 | B1 | * | 7/2003 | Peszynski et al. | 600/437 |
| 7,604,594 | B2 | * | 10/2009 | Adams et al. | 600/437 |
| 2008/0249419 | A1 | * | 10/2008 | Sekins et al. | 600/463 |
| 2010/0305443 | A1 | * | 12/2010 | Bartlett et al. | 600/443 |
| 2014/0088428 | A1 | * | 3/2014 | YANG et al. | 600/443 |

* cited by examiner

*Primary Examiner* — Amir Alavi (74) *Attorney, Agent, or Firm* — Rosenberg, Klein & Lee (57) ABSTRACT

A method of compensating ultrasound image comprising demarcating a plurality of a main material regions of an ultrasound image; executing a full compensation process to generate a full compensation image according to a first attenuation curve of the main material region; generating a brightness comparison table including a plurality of brightness zones which are correspond to a plurality of brightness compensation values according to a plurality of first pixel brightness values of the ultrasound image and a plurality of second pixel brightness values of the full compensation image; executing a linear sum process to generate a compensation image including a second attenuation curve according to the brightness compensation values; generating a compensation curve according to the first and second attenuation curve; and executing space comparison process to the compensation image to generate a better compensation image according to the compensation curve.

6 Claims, 11 Drawing Sheets

METHOD OF COMPENSATING ULTRASOUND IMAGE

FIELD OF THE INVENTION

The present invention relates to a method of compensating ultrasound image, and more particularly to a method which demarcates the main material region on the ultrasound image and then compensates the ultrasound image and enhances image contrast.

BACKGROUND OF THE INVENTION

Attending with the technological development and progress, acoustic detection technology, such as ultrasound imaging technology, has been widely used in the modern diagnostic procedure. In compared with other medical imaging systems being used in clinical medicine, such as X-ray, CT, MRI or nuclear medicine imaging, the ultrasound imaging technology has the advantages of low price, non-invasive, no danger of radiation, real-time imaging, mm level spatial resolution, portability, and blood detectable, and thus is widely used in clinical diagnosis of various departments.

The ultrasound imaging technology creates images based on scattering and reflection of sound wave. Because strength of echo of the sound wave produced by the probe decreases attending with the increasing of medium depth, brightness and effective dynamic range of the resulted ultrasound image would be declined accordingly. In addition, decline of brightness of the ultrasound images for various organs or positions of human body would be different, which influences reliability of clinical diagnosis.

In order to access the actual image without attenuation and correct diagnosis information, the clinical diagnosis nowadays usually applies a predetermined linear brightness compensation to the ultrasound image and then adjust the brightness gain and dynamic range based on the experience of the operator. The process wastes lots of time and is quite inconvenient.

BRIEF SUMMARY OF INVENTION

In view of the traditional technology, ultrasound imaging applied to various organs or positions of human body would have different brightness decline, which influences reliability of clinical diagnosis. In addition, the ultrasound image also needs the operators to adjust brightness gain and dynamic range based on their experience, which derives the issue of low efficiency and operational inconvenience.

Accordingly, it is a main object of the present invention to provide a method of compensating ultrasound image to compensate the ultrasound image automatically. The provided method demarcates the main material regions on the ultrasound image and then compensates the ultrasound image based on the depth and enhances image contrast. Thus, reliability of clinical diagnosis and operational convenience can be improved.

Based on the above mentioned object, a method of compensating ultrasound image is provided in accordance with an embodiment of the present invention. The method comprises the steps of: (a) receiving an ultrasound image with a plurality of first pixel brightness values; (b) demarcating a plurality of main material regions of the ultrasound image to generate a first attenuation curve of the main material regions; (c) executing a full compensation process to generate a full compensation image with a plurality of second pixel brightness values corresponding to the first pixels according to the first attenuation curve; and (d) generating a brightness comparison table including a plurality of brightness zones corresponding to a plurality of distinct brightness compensation values according to the first pixel brightness values and the second pixel brightness values.

After executing step (d), the present invention further comprises the step of: (e) executing a linear sum process to the ultrasound image and the full compensation image generate a compensation image with a second attenuation curve according to the brightness compensation values; (f) generating a compensation curve according to the first attenuation curve and the second attenuation curve; (g) accessing a depth, a first brightness enhance value, and a second brightness enhance value of the compensation curve; and (h) executing a space comparison process to the compensation image to generate a better(modified) compensation image according to the depth, the first brightness enhance value, and the second brightness enhance value.

In accordance with a preferred embodiment of the present invention, the linear sum process of the above mentioned step (e) is executed by using a 2D weight mask. In addition, the compensation image further comprises a plurality of third pixel brightness values corresponding to the first pixel brightness values and the second pixel brightness values, the brightness compensation values are defined as $\alpha$, the first pixel brightness values are defined as P1, the second pixel brightness values are defined as P2, the third pixel brightness values are defined as P3, and the linear sum process has $P3=\alpha*P1+(1-\alpha)P2$. Moreover, the brightness compensation values are ranged between 0 to 1, and the space comparison process of step (g) is executed by using an adaptive 2D gamma filter.

In accordance with a preferred embodiment of the present invention, the depth is defined as d, the first brightness enhance value is defined as r1, the second brightness enhance value is defined as r2, and a contrast enhance value $\gamma$ is further identified by using the space comparison process to generate the modified compensation image according to a threshold value rth, the depth d, the first brightness enhance value r1, and the second brightness enhance value r2 such that $\gamma=(r1-rth)/r2$. The threshold value rth is a predetermined value in brightness. When depth is greater than the predetermined depth d, the contrast enhance value $\gamma$ is further identified by using the corresponding first brightness value r1 and the second brightness value r2, and also the threshold value rth.

The method of compensating ultrasound image provided in the present invention is capable of compensating brightness along depth direction automatically, thus, the unwanted influence of brightness decline because of medium depth can be effectively reduced to enhance reliability of clinical diagnosis. In addition, the method provided in the present invention is capable to adaptively compensate brightness automatically, which should be an effective approach to resolve the problem of inconvenience and image variation of transitional ultrasound imaging system in which the compensation curve needs to be adjusted manually. Thus, the operation of ultrasound imaging in clinical diagnosis can be more efficiency.

The embodiments adopted in the present invention would be further discussed by using the flowing paragraph and the figures for a better understanding.

DETAILED DESCRIPTION OF THE INVENTION

There are various embodiments of the method of compensating ultrasound image in accordance with the present invention, which are not repeated hereby. The preferred embodiments are mentioned in the following paragraph as an example. It should be understood by those skilled in the art that the preferred embodiments disclosed in the following paragraph are merely an example instead of restricting the scope of the invention itself.

Figure 1:
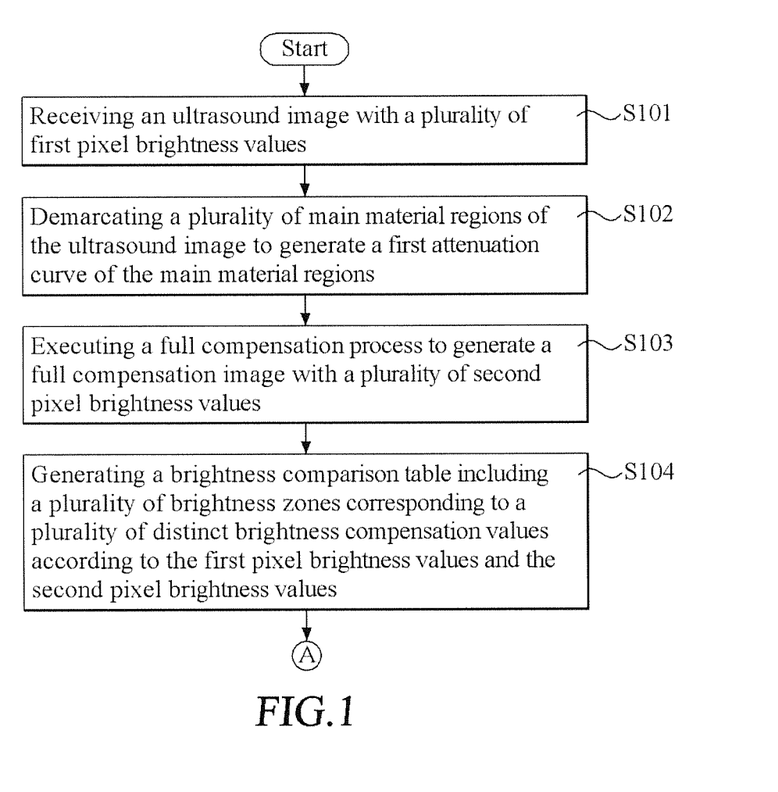
FIG. 1 and FIG. 1A are flow charts showing the method of compensating ultrasound image in accordance with a preferred embodiment of the present invention.
Figure 1A:
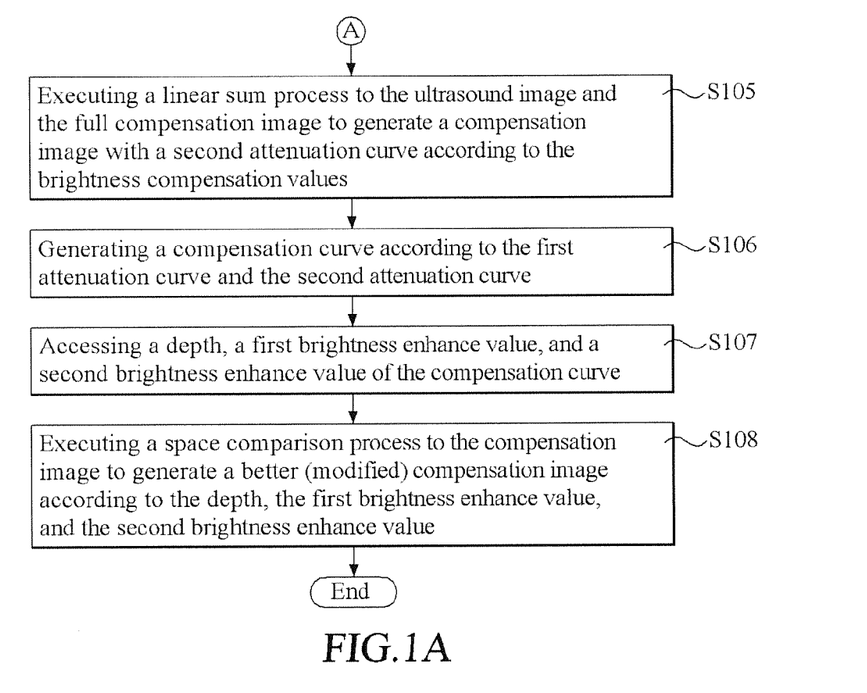
Figure 2:
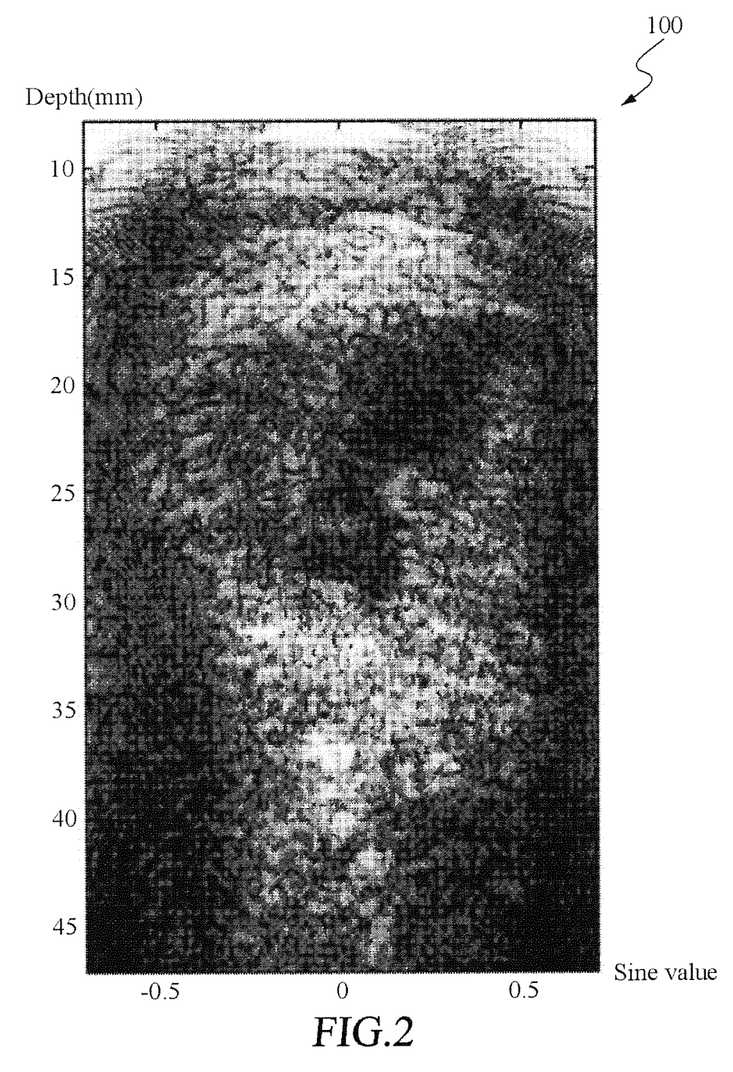
FIG. 2 is a schematic view showing the ultrasound image in accordance with a preferred embodiment of the present invention.
Figure 2A:
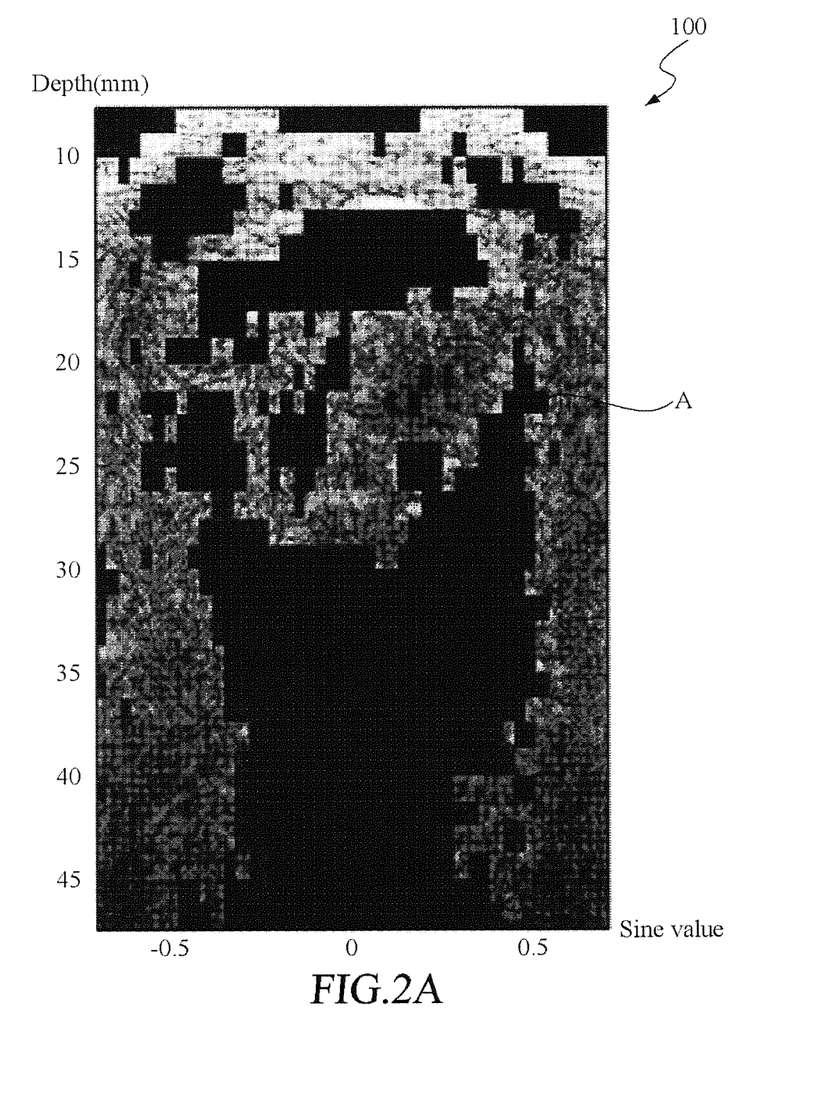
FIG. 2A is a schematic view showing the main material region in accordance with a preferred embodiment of the present invention.
Figure 3:
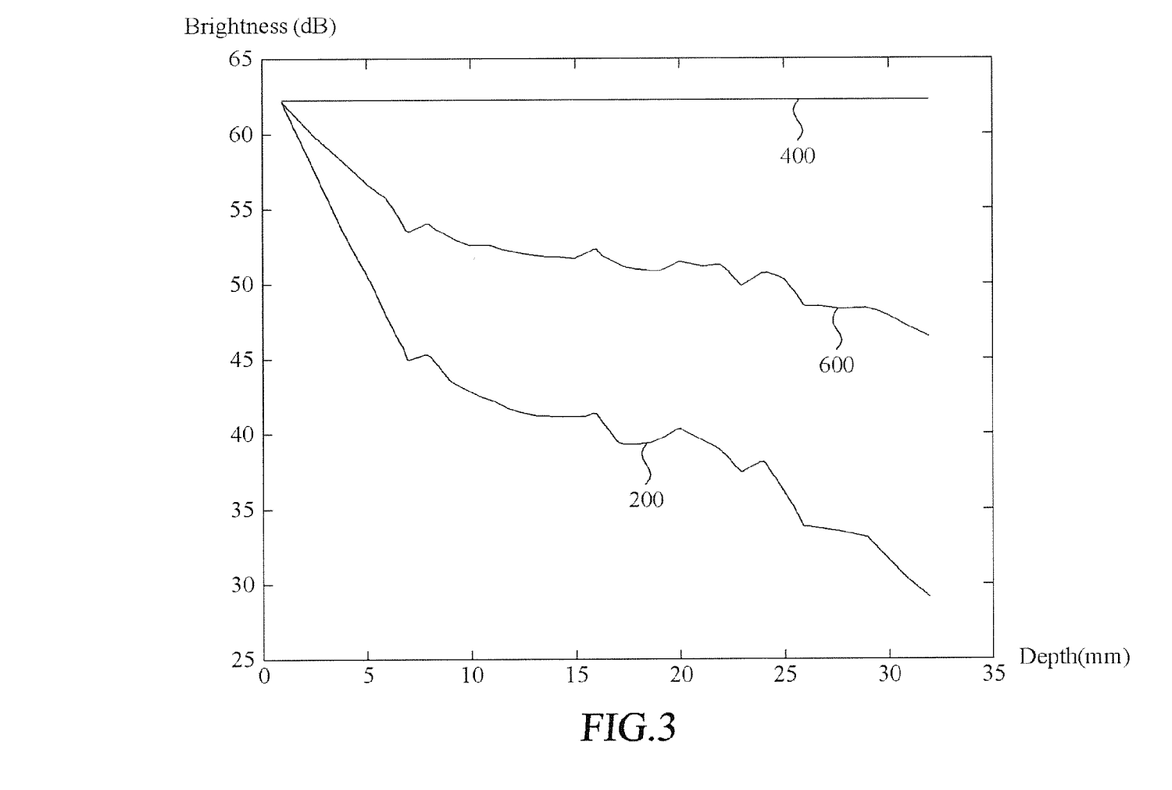
FIG. 3 is a schematic view showing the first attenuation curve, the second attenuation curve, and the third attenuation curve in accordance with a preferred embodiment of the present invention.
Figure 4:
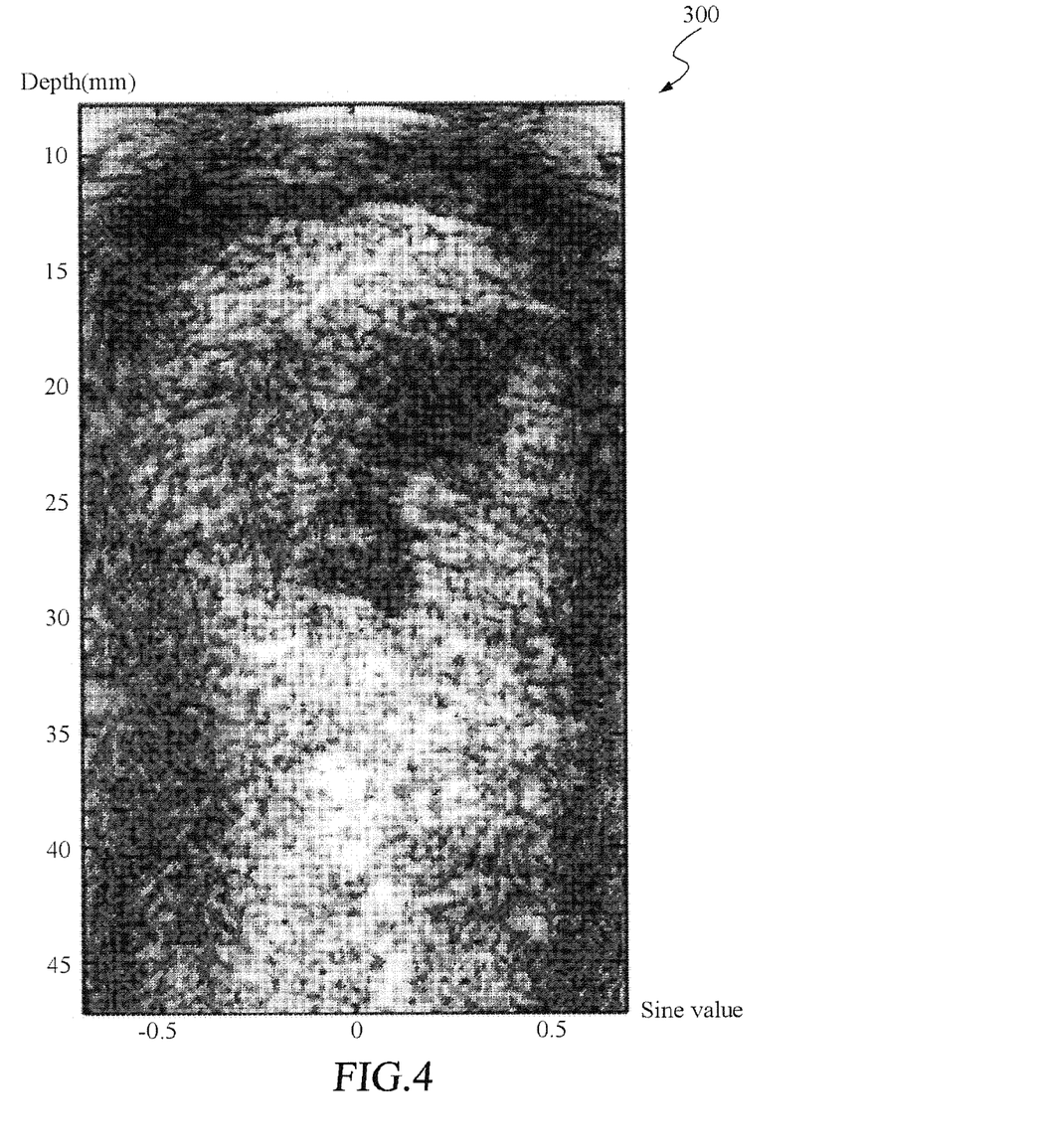
FIG. 4 is a schematic view showing a brightness comparison table in accordance with a preferred embodiment of the present invention.
Figure 5:
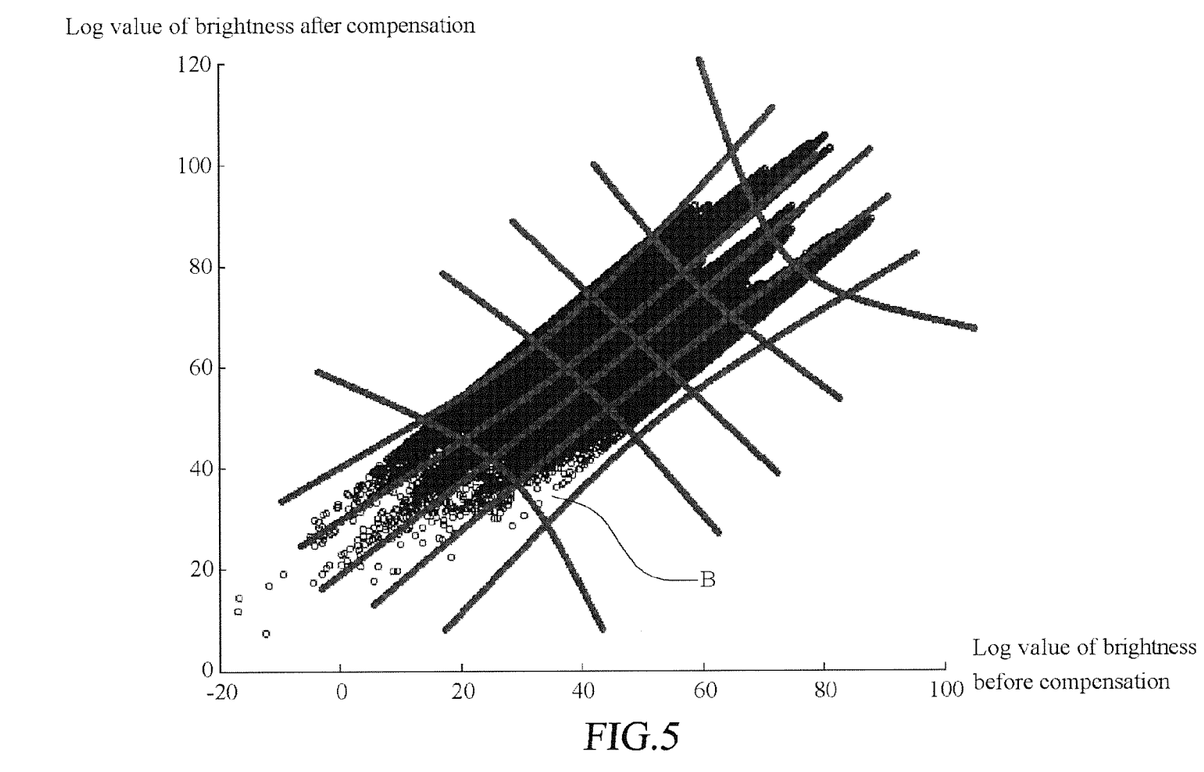
FIG. 5 is a schematic view showing the comparison of the first attenuation curve and the second attenuation curve.
Figure 6:
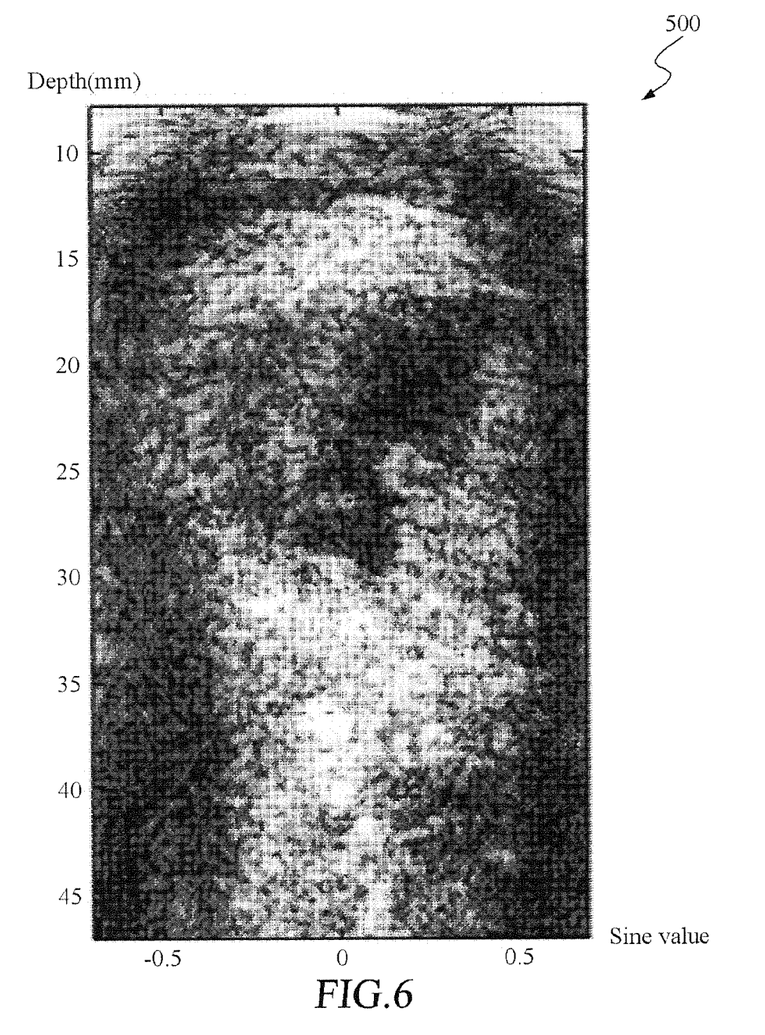
FIG. 6 is a schematic view showing the compensation image in accordance with a preferred embodiment of the present invention.
Figure 7:
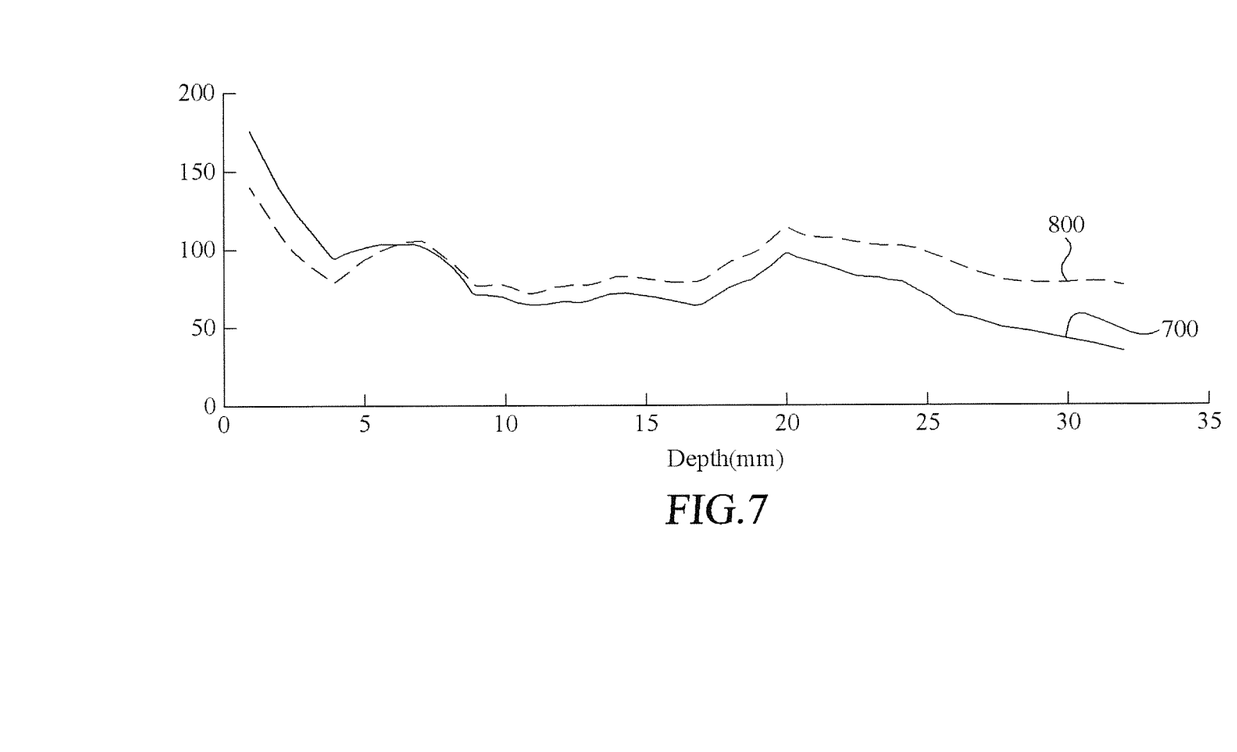
FIG. 7 is a diagram showing the first attenuation curve and the second attenuation curve in accordance with a preferred embodiment of the present invention.
Figure 7A:
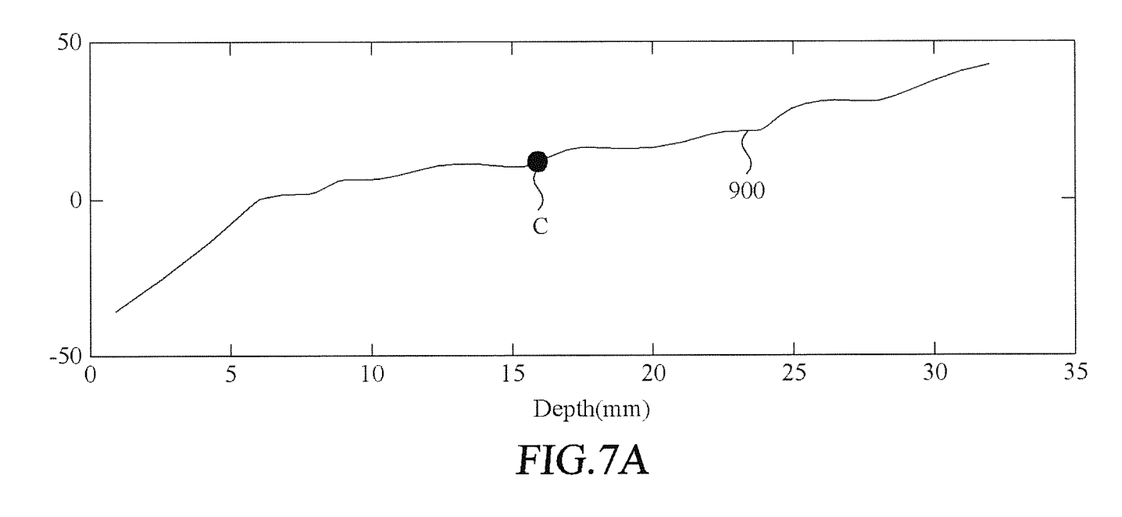
FIG. 7A is a diagram showing the compensation curve in accordance with a preferred embodiment of the present invention.
Figure 8:
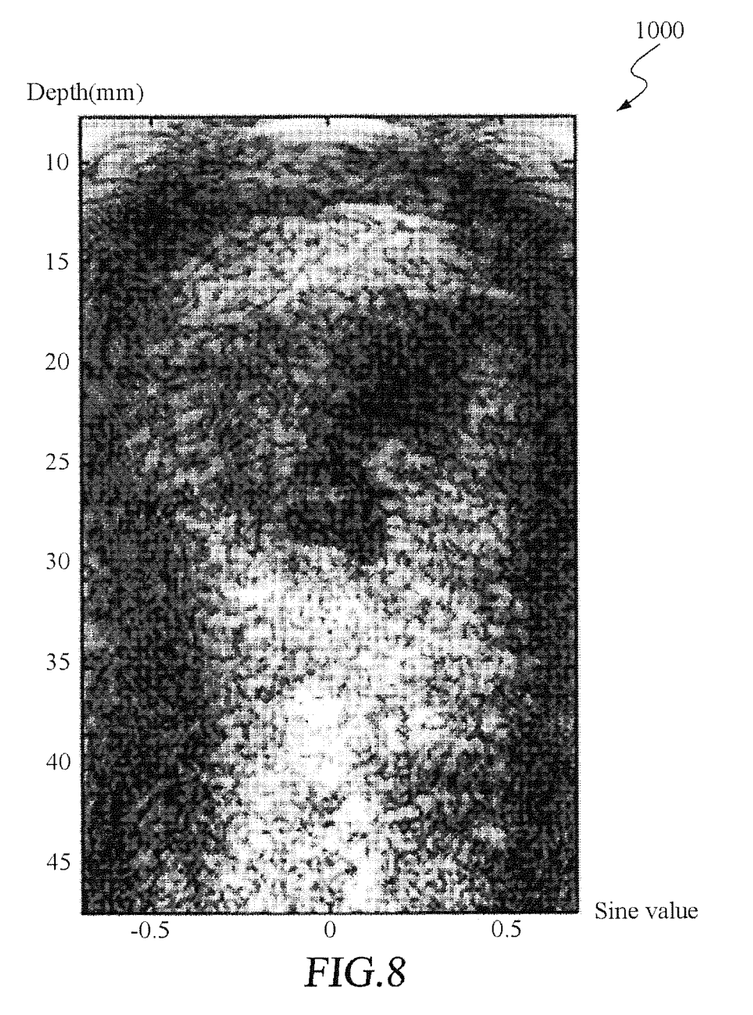
FIG. 8 is a schematic view showing the better (modified) compensation image in accordance with a preferred embodiment of the present invention.

FIG. 1 and FIG. 1A are flow charts showing the method of compensating ultrasound image in accordance with a preferred embodiment of the present invention, FIG. 2 is a schematic view showing the ultrasound image in accordance with a preferred embodiment of the present invention, FIG. 2A is a schematic view showing the main material region in accordance with a preferred embodiment of the present invention, FIG. 3 is a schematic view showing the first attenuation curve, the second attenuation curve, and the third attenuation curve in accordance with a preferred embodiment of the present invention, FIG. 4 is a schematic view showing a brightness comparison table in accordance with a preferred embodiment of the present invention, FIG. 5 is a schematic view showing the comparison of the first attenuation curve and the second attenuation curve, FIG. 6 is a schematic view showing the compensation image in accordance with a preferred embodiment of the present invention, FIG. 7 is a diagram showing the first attenuation curve and the second attenuation curve in accordance with a preferred embodiment of the present invention, FIG. 7A is a diagram showing the compensation curve in accordance with a preferred embodiment of the present invention, and FIG. 8 is a schematic view showing the better (modified) compensation image in accordance with a preferred embodiment of the present invention.

As shown, the method of compensating ultrasound image provided in the preferred embodiment of the present invention can be applied to ultrasound image of all the imaging medium, such as the organs of human body or blood flows. The method comprises the steps as below:

Step S101: receiving an ultrasound image with a plurality of first pixel brightness values;

Step S102: demarcating a plurality of main material regions of the ultrasound image to generate a first attenuation curve of the main material regions;

Step S103: executing a full compensation process to generate a full compensation image with a plurality of second pixel brightness values;

Step S104: generating a brightness comparison table including a plurality of brightness zones corresponding to a plurality of distinct brightness compensation values according to the first pixel brightness values and the second pixel brightness values;

Step S105: executing a linear sum process to the ultrasound image and the full compensation image to generate a compensation image with a second attenuation curve according to the brightness compensation values;

Step S106: generating a compensation curve according to the first attenuation curve and the second attenuation curve;

Step S107: accessing a depth, a first brightness enhance value, and a second brightness enhance value of the compensation curve; and Step S108: executing a space comparison process to the compensation image to generate a better (modified) compensation image according to the depth, the first brightness enhance value, and the second brightness enhance value.

After the process starts, step S101 is carried out to receive an ultrasound image including a plurality of first pixel brightness values. The ultrasound image 100 received in this step is an original ultrasound image as shown in FIG. 2, which is the original image based on the echo of the ultrasound wave radiated to the medium such as tissue of human organ. The ultrasound image is composed of a plurality of first pixels (not labeled in the figure) corresponding to a plurality of first pixel brightness values.

After completion of step S101, step S102 is carried out to demarcate a plurality of main material regions of the ultrasound image so as to generate a first attenuation curve. Concretely speaking, as shown in FIG. 2 and FIG. 2A, the regions of main material are demarcated as the main material regions A, and the main material regions A are regarded as portion of the main tissue. Thereafter, determining the regions along the depth direction from the main material regions based on energy distribution and average energy value. The portions with similar condition are determined as the same tissue. Theoretically, where there has sudden change of brightness can be determined as of different tissues, and the continuation of main material region A is stopped thereby. However, if it is determined to be of the same tissue, the main material region A keeps extending downward. After demarcate the main material regions A, an attenuation curve along the depth direction of the main material region A is formed as the first attenuation curve 300 as shown in FIG. 3.

After completion of step S102, step S103 is carried out to execute a full compensation process to the first attenuation curve so as to generate a full compensation image with a plurality of second pixel brightness values. Concretely speaking, in this step, a full compensation process is executed to the first attenuation curve to have the first attenuation curve reach the same brightness. The full compensation process is well known for those skilled in the art and thus is not repeated here. After the full compensation process, the full compensation image 300 as shown in FIG. 4 is generated. The full compensation image 300 includes a plurality of second pixels (not labeled in the figure) corresponding to a plurality of second pixel brightness values for generating the full compensation curve 400 as shown in FIG. 3.

After completion of step S103, step S104 is carried out to generate a brightness comparison table including a plurality of brightness zones corresponding to a plurality of distinct brightness compensation values according to the first pixel brightness values and the second pixel brightness values. Wherein, signal to noise ratio (SNR) of ultrasound image 100 is greater the full compensation image 300, which implies better image quality. In contrast, brightness distribution of the full compensation image 300 which undergoes a brightness enhancing process is more uniform than the ultrasound image 100. Thus, to enhance compensation accuracy, the present step is carried out prior to the compensation step to generate the brightness comparison table as shown in FIG. 5 based on the first pixel brightness values included in the ultrasound image 100 and the second pixel brightness values included in the full compensation image 300. The brightness comparison table is of logarithmic scale. The horizontal axis value corresponds to the logarithm value of brightness before compensation, which is the logarithm value of the first pixel brightness value. The vertical axis value corresponds to the logarithm value of brightness after compensation, which is the logarithm value of the second pixel brightness value.

In addition, the brightness comparison table is divided into a plurality of brightness zones B. The grouping process of brightness zones B can be executed automatically according to different brightness areas using algorithm. Moreover, each brightness zones B is with respect to a distinct brightness compensation value. In the preferred embodiment of the present invention, the brightness compensation value defined as α is ranged between 0 to 1. The greater brightness compensation value implies that the output is more close to the high quality image. The smaller brightness compensation value implies that the output is more close to the image with even brightness.

After completion of step S104, in step S105, a linear sum process is carried out to the ultrasound image and the full compensation image so as to generate a compensation image with a second attenuation curve according to the brightness compensation values. Concretely speaking, there might be various tissues included in the ultrasound image 100 received in step S101, which might have different attenuation values during the ultrasound imaging process. Thus, although the main material regions A (the black region in the figure) are demarcated in step S102 for attenuation determination, the demarcated regions and the un-demarcated regions might have different attenuation values in fact. It is unreasonable to use the attenuation values of the demarcated regions as those for the un-demarcated regions. Thus, according to a preferred embodiment of the present invention, in order to make image brightness of different tissues in the compensated image reasonable, step S104 is executed prior to step S105 to reduce the unwanted influence of wrong attenuation compensation used in the un-demarcated regions.

In the present step S105, a linear sum process is executed to the ultrasound image 100 and the full compensation image 300 according to the brightness compensation values of each of the brightness zones B so as to generate a compensation image 500 as show in FIG. 6, which having a second attenuation curve 600 as shown in FIG. 3. In detail, as a preferred embodiment, the linear sum process is executed by using an algorithm of 2D weight mask. In addition, the compensation image 500 includes a plurality of third pixels (not labeled in this figure) corresponding to a plurality of third pixel brightness values. The third pixel brightness values should be with respect to the first pixel brightness values and the second pixel brightness values because the compensation image 500 is generated based on the ultrasound image 100 and the full compensation image 300 using the linear sum process.

Take the first pixel brightness values as P1, the second pixel brightness values as P2, the third pixel brightness values as P3. The third pixel brightness values P3 will follow the function $P3 = \alpha * P1 + (1-\alpha) P2$ based on the linear sum process of a preferred embodiment of the present invention. Advantageously, because SNR becomes worse when doing brightness compensation, the un-demarcated tissues/regions defined in step S102, which have an average brightness different from that of the demarcated main material regions A, will have such problem and should be adequately compensated. The step S104 and step S105 are introduced to compensate the drawback that the un-demarcated tissues/regions are missed in the attenuation calculation of step S102 and step S103 so as to reduce the influence effectively.

After completion of step S105, the step S106 is carried out to generate a compensation curve according to the first attenuation curve and the second attenuation curve. In this step, the first attenuation curve 200 and the second attenuation curve 600 are modified to generate the first attenuation average curve 700 and the second attenuation average curve 800 as shown in FIG. 7 by mapping the vertical axis from brightness to average value. Then, the difference of the two curves 700 and 800 are used to generate the compensation curve 900 as shown in FIG. 7A.

After the completion of step S106, the step S107 is executed to access a depth, a first brightness enhance value, and a second brightness enhance value of the compensation curve 900. Concretely speaking, this step fetches a point on the compensation curve 900, which includes the depth, the first brightness enhance value, and the second brightness enhance value. As shown, the compensation point C is fetched with the depth as d, the first brightness enhance value as r1, and the second brightness enhance value as r2.

When the brightness compensation value is 1, which means no compensation, the first brightness enhance value should be 0, and when the brightness compensation value is not 1, which means the weight of the full compensation image is included, the brightness has certain enhancement and the enhance value, the first brightness enhance value r1, would be changed according attending with the depth. The second brightness enhance value r2 is the average value of brightness enhancement of the whole image. As shown in FIG. 7, the first attenuation average curve 700 shows brightness attenuation of each layer of the ultrasound image 100, the second attenuation average curve 800 shows brightness attenuation of each layer of the ultrasound image after compensation. As shown, the second attenuation average curve 800 has greater compensation in compared with the first attenuation average curve at the deeper location. In addition, referring to the compensation curve 900 of FIG. 7A, the compensation changes attending with the increasing of depth. For a given depth value (depth d of the compensation point C), contrast of the compensation image 500 should be enhanced as the brightness is greater than that corresponding to the depth value.

That is, the step S107 the needed contrast enhancement with respect to the depth. Then, the step S108 can be carried out to execute a space comparison process to the compensation image to generate a better (modified) compensation image according to the depth, the first brightness enhance value, and the second brightness enhance value. Concretely speaking, as a preferred embodiment, the space comparison process is carried out by using an adaptive 2D gamma filter so as to find out a contrast enhance value γ based on a threshold value rth, the depth d, the first brightness enhance value r1, and the second brightness enhance value r2. The threshold value rth is a predetermined value in brightness. When the depth is greater than the predetermined depth d, the contrast enhance value γ is identified by using the corresponding first brightness value r1 and the second brightness value r2, and also the threshold value rth. Then, the contrast enhance value is used to generate the modified compensation image 1000 as shown in FIG. 8 to complete the compensation process.

Moreover, it should be noted that, according to a preferred embodiment of the present invention, the contrast enhance value γ, which follows the function: γ=(r1−rth)/r2, indicates the filter parameter along the depth direction. Because the brightness enhancement of certain regions of the compensated image will result in a feeling of reducing contrast, the step S107 adopts the adaptive 2D gamma filter to generate linear contrast enhance value γ to deeper location with brightness enhancement greater than average so as to have the contrast enhancement corresponding with the brightness enhancement, meanwhile, this step also considers the issue that shallow layers should not have too much contrast adjustment so as to generate a better compensation image which is easier to analyze.

In conclusion, the method of compensating ultrasound image provided in the present invention is capable of compensating brightness along depth direction automatically, thus, the unwanted influence of brightness decline because of medium depth can be effectively reduced to enhance reliability of clinical diagnosis. In addition, the method provided in the present invention is capable to adaptively compensate brightness automatically, which should be an effective approach to resolve the problem of inconvenience and image variation of transitional ultrasound imaging system in which the compensation curve needs to be adjusted manually. Thus, the operation of ultrasound imaging in clinical diagnosis can be more efficiency, which would be quite useful for the industry.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method of compensating ultrasound image comprising:
   (a) receiving an ultrasound image with a plurality of first pixel brightness values;
   (b) demarcating a plurality of main material regions of the ultrasound image to generate a first attenuation curve of the main material regions;
   (c) executing a full compensation process to generate a full compensation image with a plurality of second pixel brightness values corresponding to the first pixels according to the first attenuation curve;
   (d) generating a brightness comparison table including a plurality of brightness zones corresponding to a plurality of distinct brightness compensation values according to the first pixel brightness values and the second pixel brightness values;
   (e) executing a linear sum process to the ultrasound image and the full compensation image generate a compensation image with a second attenuation curve according to the brightness compensation values;
   (f) generating a compensation curve according to the first attenuation curve and the second attenuation curve;
   (g) accessing a depth, a first brightness enhance value, and a second brightness enhance value of the compensation curve; and
   (h) executing a space comparison process to the compensation image to generate a better(modified) compensation image according to the depth, the first brightness enhance value, and the second brightness enhance value.

2. The method of compensating ultrasound image of claim 1, wherein the linear sum process of step (e) is executed by using a 2D weight mask.

3. The method of compensating ultrasound image of claim 1, wherein the compensation image further comprises a plurality of third pixel brightness values corresponding to the first pixel brightness values and the second pixel brightness values, the brightness compensation values are defined as α, the first pixel brightness values are defined as P1, the second pixel brightness values are defined as P2, the third pixel brightness values are defined as P3, and the linear sum process has P3=α*P1+(1−α)P2.

4. The method of compensating ultrasound image of claim 3, wherein the brightness compensation values α are ranged between 0 to 1.

5. The method of compensating ultrasound image of claim 1, wherein the space comparison process of step (g) is executed by using an adaptive 2D gamma filter.

6. The method of compensating ultrasound image of claim 1, wherein the depth is defined as d, the first brightness enhance value is defined as r1, the second brightness enhance value is defined as r2, and a contrast enhance value γ is further identified by using the space comparison process to generate the modified compensation image according to a threshold value rth, the depth d, the first brightness enhance value r1, and the second brightness enhance value r2 such that γ=(r1−rth)/r2.

* * * * *